P. W. DALTON.
Apparatus for Rendering Tallow, &c.
No. 136,420.  Patented March 4, 1873.
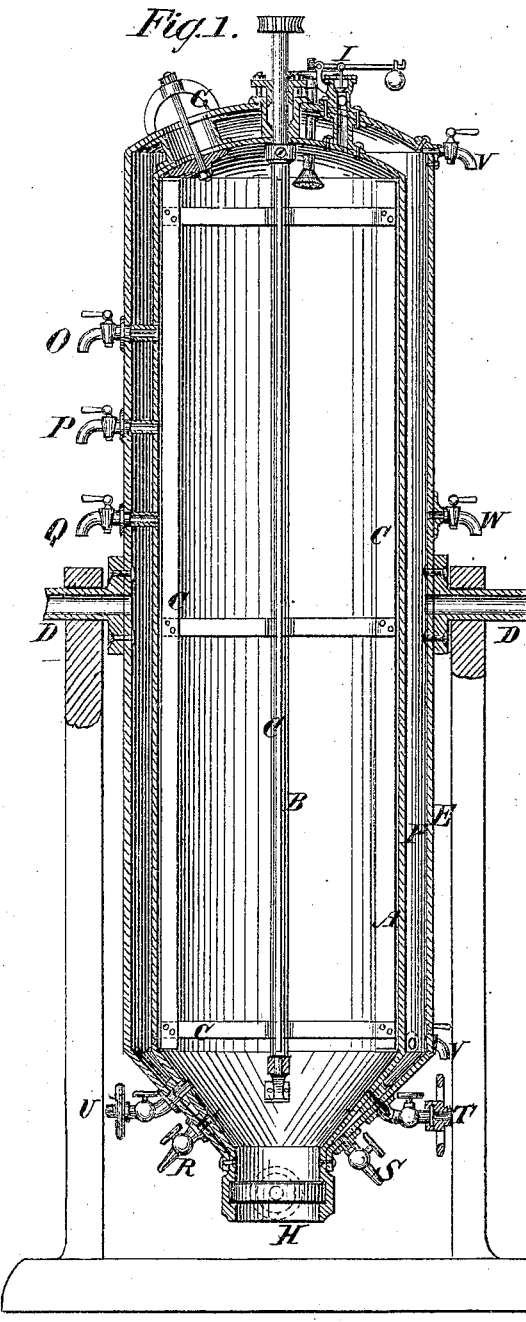
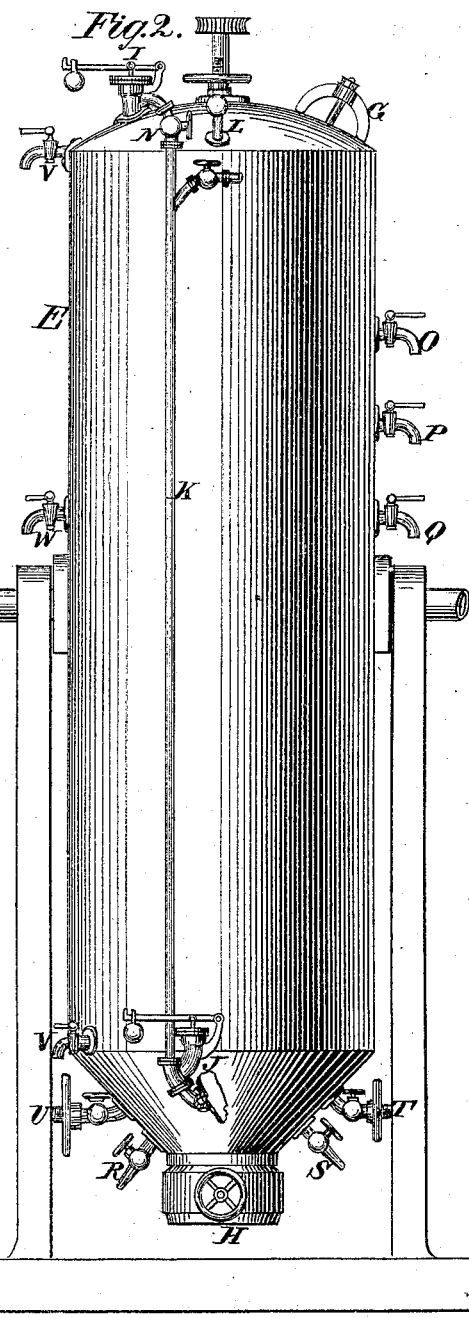
Witnesses:
John Becker
Alex F. Roberts
Inventor:
P. W. Dalton
per Munn & Co.
Attorneys.

UNITED STATES PATENT OFFICE.

PETER W. DALTON, OF JERSEY CITY, NEW JERSEY.

IMPROVEMENT IN APPARATUS FOR RENDERING TALLOW, &c.

Specification forming part of Letters Patent No. 136,420, dated March 4, 1873.

*To all whom it may concern:*

Be it known that I, PETER W. DALTON, of Jersey City, in the county of Hudson and State of New Jersey, have invented a new and useful Improvement in Tank for Rendering Tallow and Cooking and Drying Fertilizers, of which the following is a specification:

The object of this invention is to provide means for "rendering" tallow and grease and cooking and drying the fertilizing animal matters left after the tallow or grease has been separated, together with such other animal matters as may be added thereto; and it consists mainly in the means of connecting the tank or inner chamber for containing the substance to be rendered, &c., with an annular steam-space surrounding the same, whereby the surplus steam from the tank is discharged into said space, carrying offensive odors with it, and enabling them to be condensed by introduction of water through a suitable pipe, all as hereinafter described.

In the accompanying drawing, Figure 1 represents a central longitudinal section. Fig. 2 is a side view.

Similar letters of reference indicate corresponding parts.

A is the tank, which may be of any form and size, preferably a round cylinder, like the shell of a steam-boiler, with one or both ends conical. B is a central shaft, and C an agitator, which is revolved within the tank by any suitable motive power. D D are hollow trunnions. E is the jacket, to which the trunnions are attached. F represents the space between the tank and the jacket. G is a manhole, for introducing the material. H represents the discharge-valve at the other end of the tank. I is a safety-valve for the tank. J is a safety-valve for the space F. K is a pipe, which is attached to the tank safety-valve I, by means of which the surplus steam from the tank is discharged into the space F, in place of escaping into the outer air, as usual in apparatus of this class, thus avoiding the greatest objection to their use, which arises from the fact that the steam is always more or less offensive. To condense the steam thus discharged into space F, water is admitted through the pipe L, which is shown connected directly with the jacket E. It is obvious, however, that if the pipe L were joined to the pipe K instead, the same result would be accomplished by introduction of water through it or them. N is a stop-cock in the pipe K. O, P, and Q are faucets for drawing off the rendered tallow. R and S are draw-off cocks, one connecting with the tank and the other with the space F or jacket. The steam is introduced into the tank through the cock T, and water is let into the tank through the cock U. V V are pet-cocks, connecting with the jacketed space F. Steam is let into the space F through the hollow trunnions D D. W is a try-cock, to ascertain the height of water in the space F. X is the frame by which the tank and jacket are supported.

In rendering tallow or grease, or cooking and drying blood and other material for fertilizers, the operation in either case is facilitated by turning the tank on its trunnions from an upright to a horizontal or inclined position, according to the nature and condition of the material. Any suitable mechanical device may be adopted for revolving the agitator when the tank is in a horizontal or inclined position.

Having thus described my invention, I claim as new and desire to secure by Letters Patent—

In an apparatus for rendering tallow, &c., the combination of a steam-pipe, K, and water-pipe L, with an inner tank, A, and a surrounding chamber or space, F, substantially as shown and described, for the purpose specified.

P. W. DALTON.

Witnesses:
T. B. MOSHER,
ALEX. F. ROBERTS.